Nov. 1, 1932.　　　　E. E. SLICK　　　1,885,303

METHOD AND APPARATUS FOR MOLDING PLASTICS

Filed March 27, 1929　　2 Sheets-Sheet 1

INVENTOR

Nov. 1, 1932.  E. E. SLICK  1,885,303
METHOD AND APPARATUS FOR MOLDING PLASTICS
Filed March 27, 1929  2 Sheets-Sheet 2
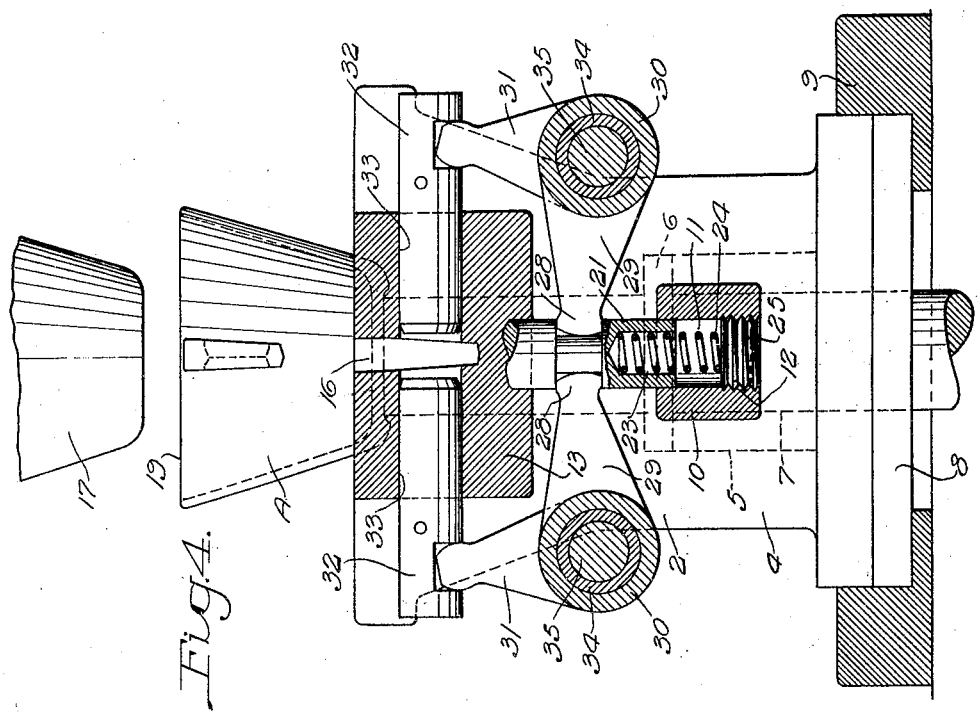
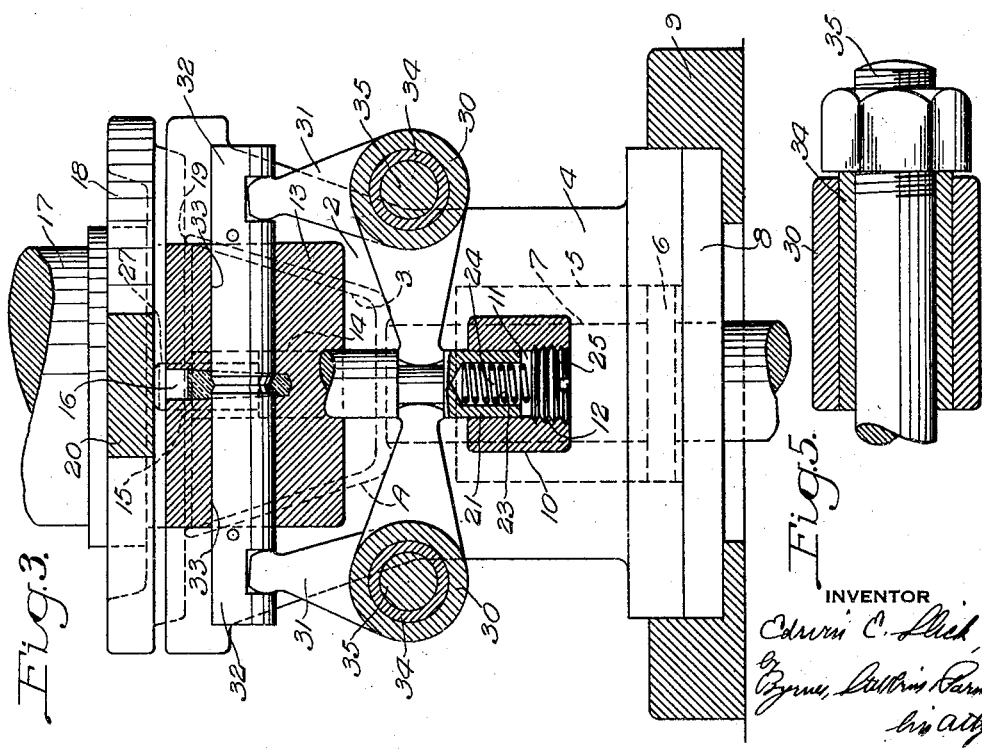
INVENTOR Patented Nov. 1, 1932

1,885,303

UNITED STATES PATENT OFFICE

EDWIN E. SLICK, OF PITTSBURGH, PENNSYLVANIA

METHOD AND APPARATUS FOR MOLDING PLASTICS

Application filed March 27, 1929. Serial No. 350,191.

The present invention relates broadly to the art of molding, and more particularly to an improved method and apparatus particularly adapted to the manufacture of handled articles, such as cups and the like, from plastic bodies of moldable material.

It has heretofore been generally necessary in the manufacture of glass articles having handles, to utilize molds which could be opened and closed. By the present invention it is possible to use a block mold and thereby not only produce articles free from objectionable seam lines, but also to reduce the costs of mold production and maintenance.

In accordance with the present invention, I preferably simultaneously form a handle or handles and the body of the cup or other article from a single gather, gob or charge of plastic material.

In the accompanying drawings, I have shown for purposes of illustration only, a preferred embodiment of my invention.

In the drawings, Figure 1 is a top plan view of a portion of a mold having a finished article in position therein;

Figure 3 is a vertical sectional view along the line III—III of Figure 1, with the parts shown in the positions they occupy during a molding operation, Figure 4 is a view similar to Figure 3, showing the parts in the position they occupy to permit removal of a finished article, and Figure 5 is a detail sectional view along the line V—V of Figure 1.

Figure 1:
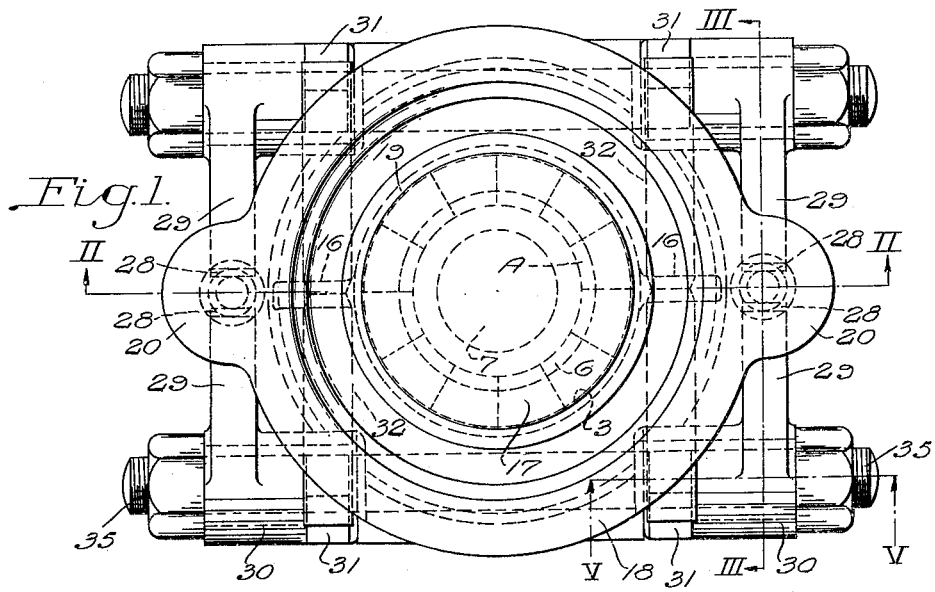

In accordance with the present invention, there is provided a block mold 2 having a molding cavity 3 therein of the contour desired for the production of a given article. The mold is formed with a downwardly projecting base portion 4, hollowed out to form a cylinder 5 for the reception of a piston 6 and plunger 7 adapted to be projected into the molding cavity 3 for ejecting an article A therefrom. The cylinder 5 may be closed at its lower end by a suitable head 8, and the entire mold may be supported in a base plate 9.

Figure 2:
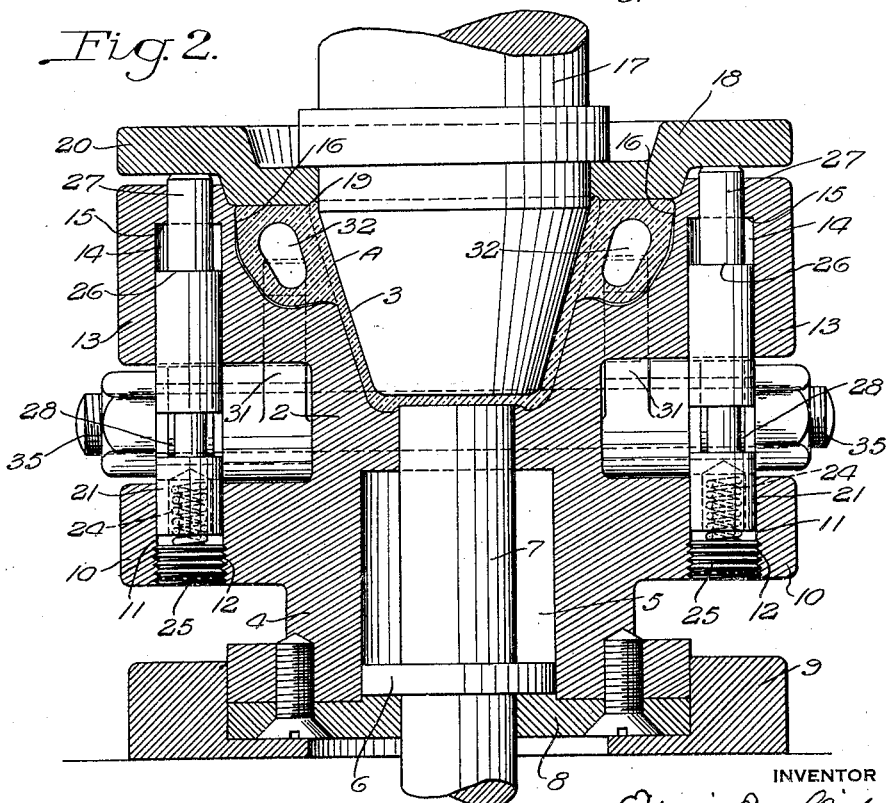
Figure 2 is a vertical sectional view along the line II—II of Figure 1.

Extending laterally from the cylinder forming portion of the mold are lugs 10, preferably occupying diametrically opposed positions, as clearly indicated in Figure 2, and provided with vertically extending openings 11 therein formed with internally threaded portions 12.

Above the lugs 10 are similar lugs 13 provided with vertically extending openings 14 in alinement with the openings 11, the openings 14 at their upper ends being of reduced diameter to provide shoulders 15.

The block mold is so constructed as to provide either one or two handle holding cavities 16, depending upon whether it is desired to provide one or more handles on the finished article. These portions will obviously be of such shape as to give the desired contour to the handles.

Cooperating with the block mold is a plunger 17 adapted to form the interior of the article, which, in Figure 1, is illustrated as being of polygonal contour. There is also a top ring 18 cooperating with the block mold and plunger to complete the rim 19 of the article, this ring being of such construction as to provide projecting portions 20 adapted to overlie the aligned openings 11 and 14.

Movably positioned in the aligned openings just referred to is a plunger 21 having at its lower end a recess 23 for the reception of a compression spring 24, seating at one end against the bottom of the recess and at the other end against the upper side of a plug 25, threaded into position in each of the lugs 10.

The plunger sections at their upper ends are of reduced diameter to provide shoulders 26 for cooperation with the shoulder 15 and actuating portions 27, normally extending through and above the lugs 13. The plunger sections are held in this position by the springs 24.

Intermediate each pair of lugs 10 and 13, the plunger sections are shaped to receive the ends 28 of levers 29 secured to and projecting from the hubs 30. These hubs are provided with other levers 31 displaced an angular distance of approximately 90° from the levers 28 and cooperating at their upper ends with handle forming plungers 32 movable transversely in aligned openings 33 in the lugs 13. At their inner ends the handle molding plungers are preferably shaped, as indicated in Figures 3 and 4, so as to enter a handle from opposite sides thereof and form the desired opening therein, the ends being tapered to give an attractive appearance to the handle and also to permit easy withdrawal of the molding plungers.

The hubs 30 are rotatably mounted on spacing sleeves 34, which in turn are held in position by bolts 35, the spacing sleeves preventing binding of the hubs.

With a construction of the character described, the descent of the ring 18 brings it into engagement with the portions 27 of the plunger sections, thereby depressing them against the action of the springs 24. This movement in turn is effective through the levers 29 and 31 for moving the molding plungers 32 inwardly into the position illustrated in Figure 3 for properly molding the handles. As the ring 18 rises, the parts return to the position illustrated in Figure 4 to free the finished article and permit ejection thereof upon operation of the plunger 7.

From the foregoing description it will be understood that where only a single handle is desired, there will only be a single pair of plunger sections 21 and 22 with their cooperating parts, while if a boullion cup or similar article with double handles is being produced, this mechanism will be duplicated on opposite sides of the mold.

By reason of a construction of the character herein described, the descent of the plunger 17 is simultaneously effective for shaping the main body of the article and for displacing a portion of the glass into the handle forming cavity or cavities 16, wherein it is engaged by the inwardly moving plungers 32 and the desired opening formed therein. In this manner it is possible to simultaneously form the body of an article and one or more handles thereon, thus obviating the delay and expense incident to the individual formation of these parts, the separate assembly thereof, and the possibility of imperfect joining of the parts.

While I have herein described a preferred embodiment of my invention, it will be understood that changes in the construction and arrangement of the parts, as well as in the operation thereof, may be made without departing either from the spirit of my invention or the scope of my broader claims.

I claim:

1. A mold having a matrix shaped for the simultaneous formation of a body of a vessel and a handle thereon, molding means cooperating with the handle forming portion for forming an opening through a handle, and automatic means for actuating said molding means during and after the forming operation.

2. A mold having a matrix shaped for the simultaneous formation of a body of a vessel and a handle thereon, molding means cooperating with the handle forming portion for forming an opening therethrough, forming means cooperating with the body forming portion, and means insuring simultaneous operation of said molding means and forming means.

3. A mold having a matrix shaped for the simultaneous formation of a body of a vessel and a handle thereon, handle molding plungers cooperating with the handle forming portion for forming an opening through a handle therein, and means for moving said plungers in opposite directions simultaneously with the formation of a body in the matrix.

4. A mold having a matrix shaped for the simultaneous formation of a body and a handle, a plunger for forming the body of a vessel, other plungers for forming a handle, and means insuring operation of said other plungers upon operation of said first mentioned plunger.

5. In the method of forming vessels, the steps comprising pressing a body of plastic material to shape the same and provide a handle forming portion, and subjecting said handle forming portion to pressure from the opposite sides thereof, simultaneously with said pressing step.

6. In the method of forming vessels, the steps comprising pressing a body of plastic material to shape the same and provide handle forming portions, and subjecting each of said handle forming portions to opposed pressure simultaneously with said pressing step.

7. In the method of forming vessels, the steps comprising pressing a body of plastic material to shape the same and provide a projecting handle forming portion, and subjecting said handle forming portion to a piercing operation substantially simultaneously with the pressing operation.

8. In the method of forming vessels, the steps comprising pressing a body of plastic material to shape the same and provide a handle forming portion, and subjecting said handle forming portion to piercing pressure from the opposite sides thereof substantially simultaneously with the pressing of the body.

9. A mold having a matrix shaped for the simultaneous formation of a body and handle, a plunger for forming the body of a vessel in said matrix, and a second plunger for forming a handle on said vessel, and means for moving said plungers simultaneously at right angles to each other.

10. A mold having a matrix shaped for the simultaneous formation of a body and handle, a plunger for forming the body of a vessel in said matrix, and a second plunger for forming a handle on said vessel, there being means for simultaneously operating said plungers.

11. A mold having a matrix shaped for the simultaneous formation of a body and handle, molding means cooperating therewith for forming the body of a vessel, other means cooperating therewith for forming the handle on the vessel, and means for simultaneously operating both of the first mentioned means.

12. A mold having a matrix shaped for substantially simultaneously forming a body and handle, molding means for cooperating therewith for forming the body of a vessel, other molding means for cooperating with said matrix for forming a handle on the article, means for operating the body molding means, and means actuated by said body molding means for operating the handle forming means.

13. A mold having a matrix shaped for simultaneous formation of a body of an article and a handle thereon, molding means cooperating with the body forming portion for forming the body, molding means cooperating with the handle forming portion for forming an opening through a handle therein, and means for substantially simultaneously actuating both of said molding means.

14. A mold having a matrix shaped for the simultaneous formation of a body of an article and a handle thereon, molding means cooperating with the body forming portion for forming the body, handle molding plungers cooperating with the handle forming portion for forming an opening through a handle therein, means for actuating said molding means, and means actuated by the molding means for moving the plungers in opposite directions.

15. A mold having a matrix shaped for the simultaneous formation of a body of an article and a handle thereon, molding means cooperating with the body forming portion for forming the body, handle molding plungers cooperating with the handle forming portion for forming an opening through a handle therein, means for actuating said molding means, and means for moving the plungers in opposite directions simultaneously with the formation of the body in the matrix.

In testimony whereof I have hereunto set my hand.

EDWIN E. SLICK.